June 18, 1963
D. A. WILLIAMS
3,093,973
SYSTEM FOR METERING LIQUEFIED GAS
Filed June 29, 1959
2 Sheets-Sheet 1
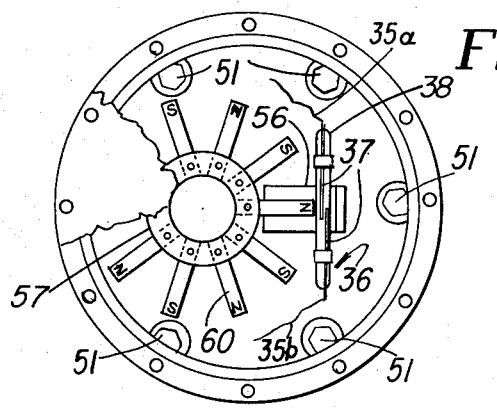
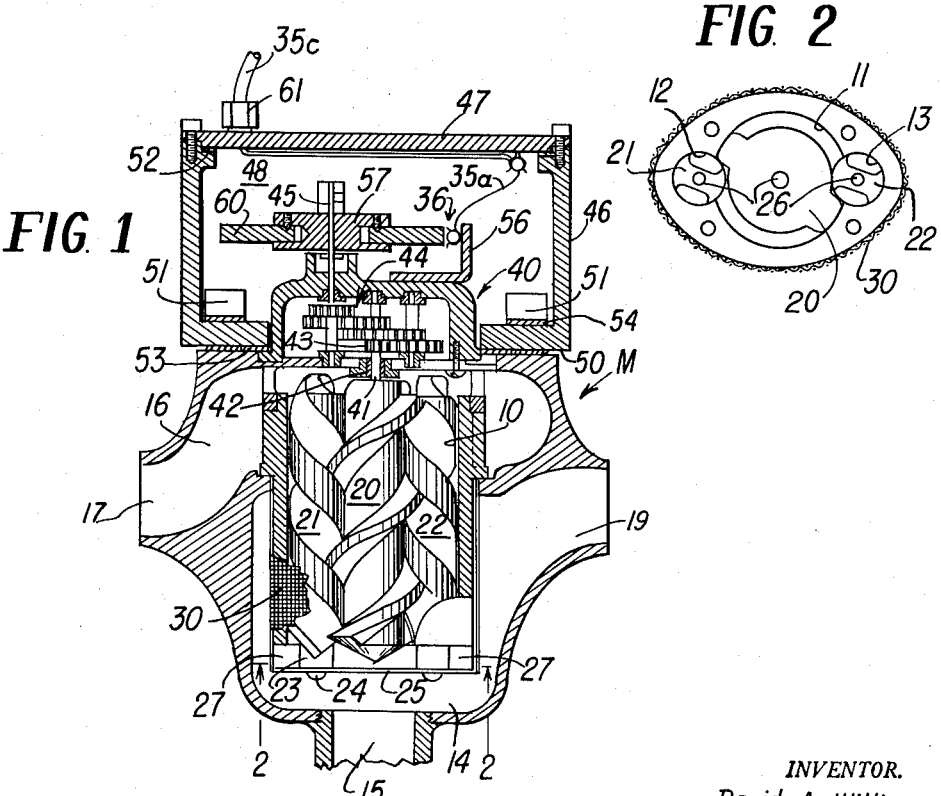
INVENTOR.
David A. Williams
BY
Atty.

June 18, 1963  D. A. WILLIAMS  3,093,973
SYSTEM FOR METERING LIQUEFIED GAS
Filed June 29, 1959  2 Sheets-Sheet 2
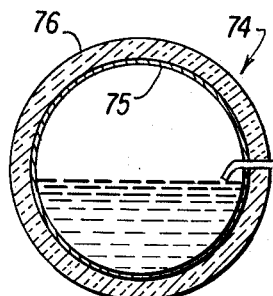
FIG. 4
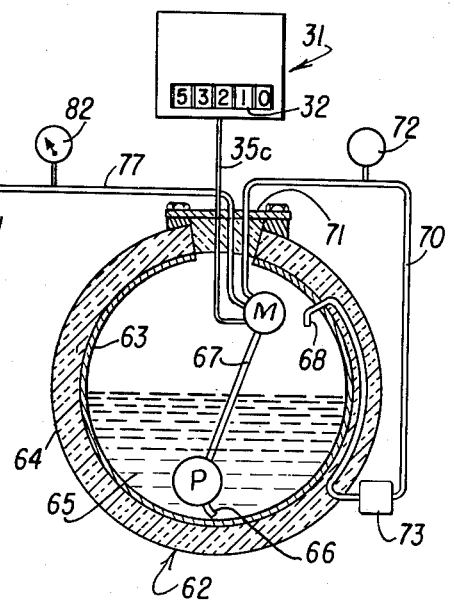
FIG. 5
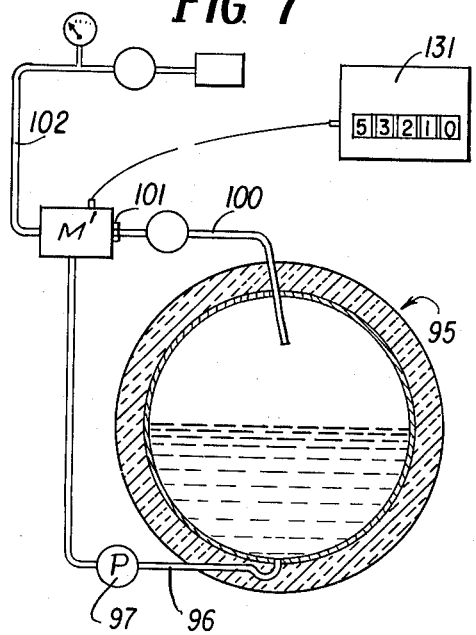
FIG. 6
FIG. 7
INVENTOR.
David A. Williams
BY
Atty United States Patent Office 3,093,973
Patented June 18, 1963

3,093,973
SYSTEM FOR METERING LIQUEFIED GAS
David A. Williams, Wheaton, Ill., assignor to Chemetron Corporation, Chicago, Ill., a corporation of Delaware
Filed June 29, 1959, Ser. No. 823,633
6 Claims. (Cl. 62—49)

This invention relates to an improved system for metering liquefied gas from a supply container to a receiving vessel, and more particularly to the metering of a liquefied gas having boiling point at atmospheric pressure below 233° K. such as liquid oxygen or nitrogen.

It is known that a liquefied gas can be metered by passing it through the metering elements of a positive displacement liquid meter of a type adapted for use with the particular low temperature liquefied gas. Such a meter may have metering elements including a metering chamber and rotary elements the movements of which are in exact proportion to the amount of liquid passed through the metering chamber. The moving elements may be arranged to drive a gear train operatively connected to a drive shaft. The drive shaft, in turn, may be connected to operate a register mechanism for recording the amount of liquid passed.

The arrangement described above is in common usage, however, it has certain inherent limitations. Specifically, the register mechanism must be mechanically connected to the rotating meter elements. For practical reasons this virtually dictates that the register mechanism must be relatively close to the meter. This may be disadvantageous because, of necessity, the register mechanism must be placed so as to be accessible to be read by the operator. However, in satisfying this condition it may not be possible to mount a meter which is mechanically connected to the register mechanism in a location adapted for maximum efficiency. Accordingly, it is a primary object of the present invention to provide apparatus for dispensing a quantity of liquefied gas including a metering system in which the meter and its register mechanism are substantially independent through the provision of means to actuate the register mechanism without a mechanical connection between the meter and the register mechanism.

Another object of the present invention is to provide a liquefied gas metering system in which signals representative of liquid flow through a meter are electrically transmitted to a register mechanism.

Conventional low temperature liquefied gas metering systems such as described above require an expensive pressure seal to seal the rotating drive shaft connected to the register mechanism. This seal must be maintained at relatively warm temperatures in order to function properly. It must then be spaced a considerable distance from the cold metering elements, tending to increase meter space requirements. Accordingly, a further object of the present invention is to provide a metering system in which there is no need for a pressure seal on a rotating shaft.

Still another object of the present invention is to provide a liquefied gas metering system including means for electrically actuating the register mechanism which is free from hazard in that the control means for the actuating means is isolated from the metered fluid.

Another object of the present invention is to provide a liquefied gas metering system which is extremely accurate, easy to maintain, low in cost, safe, more compact and improved in efficiency over conventional system.

Briefly stated, in accord with the illustrated embodiments of my invention, I provide improved apparatus for metering liquefied gas having a boiling point at atmospheric pressure below 233° K. from an insulated supply container to a receiving vessel. Mounted with the insulated container is a positive displacement type low temperature liquefied gas meter which is pre-cooled by exposure to the very cold temperature prevailing within the container. Associated with the meter, but mechanically independent thereof, is an electrically actuated register mechanism mounted in a conveniently accessible location outside the container. The control means for the actuation of the mechanism includes a sealed switch which is mounted inside the insulated container. An electrical circuit passing through the container walls connects the switch and actuator to a power source. The meter includes a conventional metering chamber and screw elements which rotate at a speed proportional to the flow of liquefied gas through the chamber. One of the screw elements is arranged to drive a gear train operatively connected to an output spindle carrying a rotor mounted in proximity to the switch. The rotor carries structure to sequentially operate the switch controlling the register mechanism actuator in proportion to the flow of liquefied gas through the meter chamber. Thus, signals representative of liquefied gas flow through the meter are electrically transmitted from the meter to the register mechanism. The apparatus includes suitable transfer conduits and pumping means to effect flow of a portion of the liquefied gas from the supply container, through the meter and the transfer conduits, to the receiving vessel.

In another illustrated system embodiment the meter is located outside the container demonstrating that the advantages of the present invention are not limited to systems in which the meter is disposed within the supply container.

The invention, both as to its organization and method of operation, together with further objects and advantages thereof will best be understood by reference to the following specification taken in connection with the accompanying drawings, in which:

FIG. 1 is an elevational sectional view of a liquefied gas meter employed in the systetm of the present invention;

FIG. 2 is a view of a section taken on the line 2—2 of FIG. 1;

FIG. 3 is a plan view of the meter of FIG. 1 with parts broken away to illustrate the rotor and switch arrangement;

FIG. 4 is a diagrammatic view of a system for metering liquefied gas from a container to a receiving vessel according to the principles of the present invention;

FIG. 5 is a schematic view illustrating the arrangement of electrical components in the present invention;

FIG. 6 is a plan view of another meter embodiment with parts broken away to illustrate a modified rotor and switch arrangement; and FIG. 7 is a diagrammatic view of another system embodiment in which a liquefied gas meter is mounted externally of a supply container.

Referring now to the drawings, FIGS. 1, 2 and 3 show the details of a meter M employed in the system of the present invention. The meter M may be a suitable positive displacement meter in which a movable metering device cooperates with stationary metering chamber walls and the metering device operates in substantially fluid sealing engagement with such walls. The metering device is moved by the flow of liquid passing through the meter through a total displacement corresponding to the quantity of liquid passing. In the illustrated meter M the movable metering device is constructed of bonded graphite or carbon.

As illustrated in FIG. 1 the type of metering elements preferably employed are similar to those disclosed in U.S. Patent No. 2,079,083 of C. O. J. Montelius, but having the improvements hereinafter described.

The meter M has a metering chamber 10, the inner walls of which comprise a vertical central cylindrical bore 11 and two cylindrical side bores 12 and 13 which are parallel to the central bore 11 and intersect the same. The bores are open at the upper and lower ends. The lower portion of the metering chamber extends into an inlet chamber 14 communicating with the inlet 15 and the upper portion of the metering chamber 10 extends into an outlet chamber 16 having an outlet 17. The meter M may also include a cooling outlet 19. Rotatably mounted within the central bore is a main screw 20, and in the side bores 12 and 13 are auxiliary screws 21 and 22 respectively, which are in intermeshing engagement with the main screw. The side screws serve to close the grooves between the threads of the main screw, the screw surfaces being so shaped as to form a fluid sealing fit to each other. The external surface of each of the screws forms a sealing fit with the walls of the respective bores. Spacer bushings 23 and suitable fasteners 24 are provided to mount a plate 25 spaced below the walls of the metering chamber and extending across its bottom. The screws 20, 21 and 22 are provided with pivot bearings 26 at their ends which rest on the plate 25 when no liquid is flowing through chamber 10. A screen 30 for screening the liquefied gas that enters the metering chamber 10 is mounted to extend over an opening 27 defined by the lower end of the walls of the metering chamber 10 and the plate 25 spaced below them.

Associated with the meter M is a register mechanism 31 of a conventional electrically actuated type schematically shown in FIG. 5. The mechanism 31 includes the usual plurality of digit cylinders 32 which are actuated by conventional means including a solenoid 33. A power source 34 which may advantageously be a D.C. power source, for example, a 12 volt battery, is connected to the solenoid 33 by an electrical conductor line 35. It will be obvious to those skilled in the art that an A.C. power source may be used in the actuation of the register mechanism in place of D.C. power source.

Referring again to FIG. 1, a gear box 40 is mounted over the top of the metering chamber 10. The upper end of the main screw 20 has a spindle 41 extending through a bearing 42 into the gear box 40. The bearing 42 is made of a suitable material, for example, a polymerized fluorinated ethylene (e.g. Teflon). It will be noted that the lower face of the bearing 42 forms a thrust bearing for main screw 20. The spindle 41 carries a pinion 43 that drives a conventional gear train 44. The bearing of the respective shafts carrying the gears and pinions forming part of the gear train may also be made of a polymerized fluorinated ethylene. The gear train 44 provides a drive for an output spindle 45 which extends through the upper wall of gear box 40 into a chamber 48 defined by a housing 46 having a suitably secured cover plate 47. The ratio of the gear train 44 is arranged so that one rotation of the output spindle 45 occurs when the liquefied gas equivalent of one hundred cubic feet of gas at normal pressure and temperature (atmospheric pressure at sea level at 70° F.) has passed through the meter M. A cover plate sealing gasket 52 of suitable material is interposed between the housing 46 and the cover plate 47. The lower wall 50 of the housing 46 is secured to the body of the meter M by means of a plurality of bolts 51. A suitable housing gasket 53 is interposed between the bottom surface of the lower wall 50 and the upper surface of the body of the meter M. Sealing washers 54 of lead or other suitable material, are respectively interposed between the heads of the bolts 51 and the housing lower wall.

A switch 36, constituting control means for the energization of the solenoid 33, is mounted within the housing 46. The switch 36 is of a type which has resilient magnetically actuated reed contact blades 37 of magnetic material. The contact blades 37 are spaced-apart and mounted in parallel side-by-side relationship. They are arranged to flex together when they are subjected to an appropriate magnetic field. The terminals of the contact blades 37 are respectively connected to mutually insulated conductors 35a and 35b which pass through a suitable pressure fitting 61 in the cover plate 47. From there the conductors 35a and 35b are carried by way of a cable 35c to the solenoid 33 and the power source 34 respectively, completing the circuit. As the cable 35c is mechanically independent of the rotating elements within the meter M; it does not rotate but remains stationary during metering, therefore the pressure fitting 61 through which it passes need not be of the relatively expensive type required to positively seal the rotating shaft members projecting from conventional liquefied gas meters. As indicated in FIG. 5, conductor 35b may be grounded or may be omitted by properly grounding the terminals to which it is connected. The tips of the blades 37 are hermetically sealed within a suitable envelope 38 to isolate contact sparks and arcing from the atmosphere around the switch in order to eliminate a combustion hazard in the event liquid oxygen, for example, is being metered. The envelope 38 may advantageously be fabricated from glass. The switch 36 may be secured to a bracket 56 mounted on the top of the gear box 40. The switch 36 is operated in sequence between open circuit and closed circuit positions by means including a rotor 57 mounted on the output spindle 45. The rotor 57 carries a plurality of radially projecting permanent magnets 60 which may be of the bar magnet type. In the illustrated embodiment ten bar magnets 60 are symmetrically disposed around the rotor 57. This arrangement has certain advantages discussed in detail below. The bar magnets 60 are mounted on the rotor 57 with substantially the same angle between the longitudinal axes of adjoining magnets and in a plane common to the switch contact blades 37. The magnets are also arranged on the rotor so that side-by-side poles of the respective magnets are of opposite polarity. The respective magnets 60 project substantially the same radial distance from the rotor and extend into proximity to the switch 36. When a pair of the projecting side-by-side opposite polarity magnet poles is carried by the rotor to closely approach a position where they are respectively on either side of the contact blade tips and approximately equidistant therefrom, the magnetic field associated with the pair of poles influences the magnetic material contact blades 37 to flex together closing the circuit. As the blades are resilient they will return to their spaced-apart positions when the respective poles are rotated so that the blade tips are no longer approximately midway between the pair of poles. Each projecting magnet pole forms an opposite polarity pair with the pole ahead of it and the pole behind it on the rotor. Accordingly, as the rotor 57 carries the respective pairs of magnet poles past the switch 36, the contact blades 37 will sequentially open and close, thus providing means for controlling the actuation of the register mechanism in proportion to the flow of liquefied gas through the meter and chamber.

Inasmuch as there are ten magnet bars 60 mounted on the rotor 57 it will be seen that ten pulses are transmitted from the housing 46 for each rotation of the output spindle 45. Accordingly, as one complete rotation of the output spindle is equivalent to one hundred cubic feet of gas at normal pressure and temperature (atmospheric pressure at sea level at 70° F.), it can be seen that a register mechanism reading accurate approximately to the nearest 10 cubic feet of gas at normal temperature and pressure can be obtained with the disclosed apparatus.

It will be recognized by those skilled in the art that the switch 36 can also be satisfactorily operated by substituting horseshoe magnets of proper number, size, and disposition for the bar magnets 60. It will also be apparent that the register mechanism readings can be adjusted to a desired degree of accuracy by appropriately increasing or decreasing the number of electrical signals transmitted per unit displacement of the metering elements. The greater the number of signals transmitted per unit displacement of the metering elements the smaller will be the possible variation between the indicated and the actual displacement of the metering elements.

Referring now to FIG. 4, an insulated supply container 62 of customary construction is shown which includes an inner vessel 63 which is suspended or otherwise supported within an external casing 64 providing an insulating space completely surrounding the inner vessel which space may be filled with insulating material of a character that is very effective for reducing the flow of heat to the cold body of liquid 65 disposed within the inner vessel. The inner vessel 63 may be provided with customary filling connections, liquid level test connections, and relief valves all of which are not shown in the interest of clearness of the drawings. The meter M, which is mechanically independent of its associated register mechanism 31, may advantageously be mounted within the inner vessel 63 as indicated in FIG. 4. This arrangement permits the meter to be pre-cooled by the cold liquefied gas and vapor contained therein. While the meter M in FIG. 4 is shown mounted in the vapor space above the liquefied gas inasmuch as supply container 62 is shown as being partially filled, it will be understood that the meter may be immersed in the liquefied gas because its disclosed construction also adapts it to operate equally well when partially immersed or totally immersed as when the container is full. Also disposed within the inner vessel 63 is a pump P of suitable construction for transferring a portion of the liquefied gas 65 from the supply container 62 to a receiving vessel. The pump P includes inlet means 66 and is connected to a transfer conduit 67 which is connected to the inlet of the meter M. A by-pass conduit 70 may be connected to the cooling outlet of the meter M. The conduit 70 passes from the meter M out through a suitable insulated cover plate 71 to the lower portion of the external casing 64 from which it extends through the insulated space to the upper portion of the supply container 62. The conduit 70 then is directed into the upper portion of the inner vessel 63, terminating in an outlet 68. The conduit 70 may include a suitable pressure gauge 72 and a stop valve 73. Also shown in FIG. 4 is a receiving vessel or container 74 of suitable construction. The container 74 is preferably of the insulated type comprising an inner vessel 75 and an outer casing 76. The container 74 may be provided with liquid and vapor discharge conduits as required for utilization of the liquefied gas, such withdrawal conduits are not illustrated in the interest of clearness of the drawings.

The receiving vessel 74 is exemplary only, and it will be understood that it may be of any kind customarily used such as a liquid gasifying chamber, a liquefied gas storing container, or a liquid vaporizing coil connected to a gas receiving means.

A transfer conduit 77 is connected to the outlet opening 17 of the meter M. The transfer conduit 77 extends from the meter M out through the walls of the supply container 62 through the cover plate 71 and is provided with a suitable coupling and may include a stop valve 81 and a pressure gauge 82. The receiving vessel 74 includes an inlet conduit 83 provided with a suitable coupling. A hose 84 may be utilized to connect the couplings of the conduits 77 and 83.

The register mechanism cable 35c extending from the pressure fitting 61 passes out of the supply container 62 through the cover plate 71 as shown in FIG. 4 to the register mechanism 31. The register mechanism 31 may be located at the most conveniently accessible location inasmuch as it is mechanically independent of the meter M and the cable 35c connecting the register mechanism and meter may readily extend for any reasonable distance.

The spacing between the register mechanism 31 and the meter M can be considered almost unlimited because the pulses transmitted over the cable, if necessary, can be amplified by conventional means to the degree necessary to accomplish the transmission of the pulses to almost any desired location. Accordingly, the meter and its associated register mechanism may be independently mounted in positions adapted to maximum metering system efficiency.

Describing now the mode of operation of the system shown in FIG. 4, when the operator desires to effect a transfer of liquid from the supply container 62 to a receiving vessel, for example, the receiving container 74, the valve 81 initially is placed in a closed condition and valve 73 is placed in an open condition to complete cooling of the meter to the liquid temperature and to remove heat which might cause vaporization of the liquid resulting in false meter indications. The pump P is then placed in operation causing a flow of liquefied gas through the transfer conduit 67 into the meter inlet chamber 14 through the inlet 15. The liquefied gas will completely fill the inlet chamber 14 and a valve 73 is open the liquefied gas may flow through the by-pass conduit 70 and the valve 73 back to the inner vessel 63. This passage of liquefied gas will force ahead of it vapors present within the inlet chamber 14. When the operator determines that the meter is sufficiently cooled and primed for operation he closes the valve 73. This permits the pressure to build up within the meter M. When the meter is pressurized a small amount of low temperature liquefied gas leakage occurs along spindle 41 into gear box 40 and along output spindle 45 into chamber 48. This liquid absorbs heat from its surroundings in housing 46 and evolves into a gas. As this gas is dry and as chamber 48 is sealed against the entry of moisture from the atmosphere, chamber 48 is frost free in spite of being in communication with the super cold liquefied gas in metering chamber 10. There is thus no problem of frost interference with moving members in chamber 48 such as rotor 57. The pressure rises within the chamber 48 until it is equal to the pressure within the metering chamber 10. No further leakage of liquefied gas into chamber 48 will then occur. This pressurizing of chamber 48 and the gear box 40 in communication with it, permits the elimination of a rotating seal since all rotating elements are totally within a pressurized space. It will also be seen that the rotor 57 turns in a space which is free of liquefied gas.

When pressurizing of chamber 48 is complete, valve 81 may be opened, permitting liquefied gas to flow to the receiving vessel 74. As liquid flows through the metering chamber 10, the flow of liquefied gas will cause rotation of the screws 20, 21 and 22. The rotation of screw 20, in turn, rotates the gear train 44 through spindle 41, causing a corresponding rotation of the output spindle 45, carrying with it the rotor 57. As the rotor 57 turns, the rotating magnet bars 60 will cause a sequential closing and opening of the switch 36 in proportion to the flow of liquefied gas through the metering chamber 10. The sequential switch closing sends pulses to the solenoid 33. The electrical pulses sequentially energize the solenoid 33 to actuate a rotation of the digit cylinders 32 corresponding to the flow of liquefied gas to the receiving vessel. When a desired volume has been transferred to the receiving vessel as indicated by the register mechanism 31, the operator may terminate the transfer.

Turning now to FIG. 6, there is shown a modified structure for controlling the actuation of a register mechanism. The structure of FIG. 6 forms part of a meter 85 including metering elements, a gear train, and other features, not shown, which are substantially the same as those illustrated in FIG. 1. Accordingly, no details of the metering elements, gear train, etc. used with the structure of FIG. 6 are illustrated for reasons of brevity and clearness of the drawings. The meter 85 includes a sealed housing 86 defining a chamber 87, into which projects an output spindle 88 driven by a suitable gear train and meter screws not shown. On the output spindle 88 is mounted a rotor 89 of suitable material. The rotor 89 may include ten symmetrically-spaced projecting lobes 90. A switch 91 of the hermetically sealed contact type is mounted within the chamber 87 in proximity to the rotor 89. A wall of the enclosure of switch 91 is broken away to illustrate details. The switch 91 comprises conventional contacts and terminals including a resilient, movable contact blade 92 which is mounted so that it is normally in open position and which may be closed by means of a pivoted operating arm 93 which extends externally of the switch enclosure. The operating arm 93 may be biased into open circuit position by resilient contact blade 92 and may be provided with a roller 94 which is mounted in the path of the rotating lobes 90 so that as each of the lobes 90 comes into contact with the roller 94, the operating arm 93 is caused to move against its biasing means, forcing contact blade 92 into closed circuit position. However, as each lobe 90 rotates beyond the roller, operating arm 93 is free to move to open circuit position under the influence of its biasing means as contact blade 92, due to its resilience, springs back to open circuit position. Accordingly, as the rotor 89 is revolved by the spindle 88, the switch 91 is sequentially operated between open circuit and closed circuit positions. It will thus be obvious that the structure of FIG. 6 may be utilized for controlling the electrical actuation of a register mechanism forming part of a liquefied gas metering system such as that illustrated in FIG. 4.

Turning now to FIG. 7 the illustrated system includes an insulated supply container 95, generally similar to the supply container 62, which is provided with a transfer conduit 96 connected to a suitable pump 97 which in turn is connected to the inlet of a meter M' disposed externally of the supply container 95. The meter M' is of sealed construction substantially identical to the meter M of FIGS. 1, 2, 3 and 4. A transfer conduit 100 extends into the space enclosed by the inner vessel of the supply container 95. Associated with the meter M' and electrically connected thereto is a register mechanism 131, substantially the same as the register 31 illustrated in FIG. 5. An outlet conduit 102 which may include a suitable pressure gauge, valve, and coupling means, extends from the meter M' to a gas receiving device which is not illustrated as it may be of any kind customarily used such as a liquid gas chamber, a liquefied gas storing container or a liquid vaporizing coil connected to a gas-receiving means.

The operation of the system of FIG. 7 is quite similar to that of FIG. 4 except that cool down of the meter M' to the liquid temperature, which is necessary before metering, will take longer than with the system of FIG. 4. The reason for this is apparent because meter M' is mounted externally of the supply container and is therefore not precooled by exposure to the very cold temperature prevailing within the liquefied gas supply container as is the meter M of FIG. 4.

It will be obvious that as the register mechanism 131, like the register mechanism 31, is mechanically independent of its associated meter, it may be mounted in the most conveniently accessible place in the system. Specifically, if desirable, the register mechanism 131 may be operated in a location remote from the meter M'. In addition, as the register mechanism 131 is electrically actuated there is no need for a pressure seal on a rotating drive shaft. Thus it will be seen that the present invention may advantageously be utilized in metering systems in which the meter is disposed externally of a liquefied gas supply container.

While there has been described what is at present considered to be the preferred embodiments of the invention, it will be understood that various modifications may be made therein, and it is intended to cover in the appended claims all such modifications as fall within the scope of the invention.

I claim:
1. Apparatus for dispensing a quantity of liquefied gas having a boiling point below 233° K. comprising, in combination: and insulated supply container holding a body of the liquefied gas at low temperature; an liquid meter of the positive displacement type adapted to meter low temperature liquefied gas mounted within said supply container whereby its temperature is substantially that of the liquefied gas body contained therein; said meter comprising a metering chamber having inlet means and outlet means, and rotating elements mounted in said chamber, said elements being arranged to rotate at a speed proportional to the flow of liquefied gas through said chamber; a meter supply conduit connecting said liquefied gas body to said meter inlet means; a transfer conduit connected between said meter outlet means and an external delivery connection to receiving means; means associated with the apparatus for effecting a flow of a portion of the liquefied gas through said transfer conduit, a register mechanism for said meter located externally of said container and mechanically independent thereof; eleccrically energizable means to actuate said register mechanism; and electrical current power source; a switch mounted within said container for controlling the energization of said actuating means, said switch having contacts sealed within an enclosure to shield gas on the interior of said container from contact sparks; an electrical circuit operatively connecting said power source, said actuating means, and said switch; and means to operate said switch in response to the rotation of said elements, whereby said external register mechanism may be electrically actuated to provide an indication of the flow of liquefied gas through the meter chamber in the interior of said container.

2. A meter device for liquefied gases having boiling points below 233° K. comprising, in combination: a sealed meter having rotating components all of which rotate wholly within the walls of said meter whereby the rotating components need not be pressure sealed, said meter having a chamber disposed in a line connected to a source of liquefied gas and an outlet; at least one rotatable element mounted in said chamber, said element being arranged to rotate at a speed proportional to the flow of liquefied gas through said chamber; means to indicate liquefied gas volume units comprising an electrically actuated register mechanism; means to actuate said register mechanism; a power source; a gas chamber in said meter above said meter chamber, said meter chamber and said gas chamber being in communication; circuit interrupting means adapted to control the actuation of said register mechanism mounted within said gas chamber; means to operate said circuit interrupting means in response to the rotation of said rotatable element, said operating means including a rotating member mounted within said gas chamber in proximity to said circuit interrupting means; a circuit operatively inter-connecting said actuating means, said circuit interrupting means and said power source; and means connecting said meter to said register, said connecting means consisting solely of a stationary flexible cable carrying at least one electrical conductor forming part of said circuit.

3. A meter device for liquefied gases having boiling points below 233° K. comprising: a sealed meter having inlet means and outlet means; a metering chamber within said meter; upright intersecting bores within said chamber; upright rotary intermeshing screws disposed in each one of said bores and in liquid sealing engagement with the wall thereof, said screws being formed of solid self-lubricating material; an electrically actuated register located outside said meter; an electric current power source; a switch disposed within said meter, said switch having spaced-apart flexible magnetic contact blades enclosed within a sealed envelope to shield the interior of the housing from contact sparks; a pressure-tight fitting mounted in a wall of said meter; an electrical circuit interconnecting said register, said power source, and said switch, said electrical circuit comprising at least one conductor passing through said fitting; a rotor chamber within said meter and in gas communication with said meter chamber; a rotor mounted within said rotor chamber; an operative connection between said rotor and one of said screws; and means for transmitting electrical signals to said register representative of the flow of liquefied gas through said meter chamber comprising a plurality of spaced-apart magnets mounted in alignment around said rotor with side-by-side pairs of poles of said magnets being of opposite polarity, said side-by-side pairs being respectively rotatable into proximity to said switch contact blades, thereby to subject the contact blades to a magnetic field strong enough to flex said blades together, momentarily closing said circuit as each of the side-by-side pairs of poles respectively rotates into operative proximity to said switch contact blades, whereby a sequential closing of said circuit occurs, electrically actuating the register in response to the flow of liquid through said meter chamber.

4. In apparatus for metering liquefied gases having boiling points below 233° K. including a meter having a meter chamber connected to a source of liquefied gas within which is mounted one or more rotatable elements, each element being arranged to rotate at a speed proportional to the flow of liquefied gas passing through such chamber, the improvement comprising: an electrically actuated register remote from the metering chamber for indicating the volume of liquefied gas metered; means for actuating the register in response to the rotation of the metering elements; a gas chamber formed in the meter above the meter chamber and in communication therewith to receive gas evolved from the liquefied gas in the meter chamber, said gas chamber being sealed from the atmosphere precluding frost formation in the gas chamber due to moisture from the atmosphere; circuit interrupting means adapted to control the actuation of said register mounted within said gas chamber; means to operate said circuit interrupting means in response to the rotation of the rotatable element, said operating means including a rotating member mounted within said gas chamber and in proximity to said circuit interrupting means, the rotating member being freely rotatable without frost interference because of the gas chamber moisture seal; a power source; a circuit operatively inter-connecting said actuating means, said circuit interrupting means, and said power source; and means connecting said meter to said register, said connecting means consisting solely of a cable carrying at least one electrical conductor forming part of said circuit.

5. In apparatus for metering liquefied gases as claimed in claim 4, in which the circuit interrupting means includes a magnetically actuated switch.

6. In apparatus for metering liquefied gases as claimed in claim 4, in which the circuit interrupting means includes a switch having an operating arm, and the means to operate said circuit interrupting means includes a rotor having at least one projection rotatable into operative relationship with said operating arm.

References Cited in the file of this patent

UNITED STATES PATENTS

| | | |
|---|---|---|
| 2,047,529 | Turk | July 14, 1936 |
| 2,514,948 | Gross | July 11, 1950 |
| 2,530,521 | Hansen | Nov. 21, 1950 |
| 2,599,901 | Dumas | June 10, 1952 |
| 2,607,221 | Babson et al. | Aug. 19, 1952 |
| 2,610,471 | Thayer | Sept. 16, 1952 |
| 2,649,712 | Dale | Aug. 25, 1953 |
| 2,915,606 | Knauth | Dec. 1, 1959 |
| 2,988,916 | Waugh | June 20, 1961 |